(12) United States Patent
Niemi

(10) Patent No.: US 6,415,294 B1
(45) Date of Patent: Jul. 2, 2002

(54) ELECTRONIC FILE RETRIEVAL METHOD AND SYSTEM

(75) Inventor: Terho Reima Eerik Niemi, Vantaa (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/250,691

(22) Filed: Feb. 16, 1999

(30) Foreign Application Priority Data

Jun. 11, 1998 (FI) .................................................. 981355

(51) Int. Cl.[7] .............................................. G06F 17/30
(52) U.S. Cl. ........................ 707/102; 707/104.1; 707/3; 707/501; 707/513
(58) Field of Search .............................. 707/102, 513, 707/501, 104, 3

(56) References Cited

U.S. PATENT DOCUMENTS

| 5,664,160 | A | * | 9/1997 | Fecteau et al. ................ 703/23 |
| 5,794,257 | A | * | 8/1998 | Liu et al. ..................... 707/501 |
| 5,819,301 | A | * | 10/1998 | Rowe et al. ................. 707/513 |
| 5,835,905 | A | * | 11/1998 | Pirolli et al. .................... 707/3 |
| 5,852,820 | A | * | 12/1998 | Burrows ........................ 707/2 |
| 5,983,221 | A | * | 11/1999 | Christy ........................... 707/5 |
| 6,055,538 | A | * | 4/2000 | Kessenich et al. .......... 707/101 |
| 6,070,157 | A | * | 5/2000 | Jacobson et al. .............. 707/1 |
| 6,073,143 | A | * | 6/2000 | Nishikawa et al. ......... 707/513 |
| 6,101,503 | A | * | 8/2000 | Copper et al. .............. 707/104 |
| 6,112,203 | A | * | 8/2000 | Bharat et al. .................. 707/5 |
| 6,125,361 | A | * | 9/2000 | Chkrabarti ..................... 707/3 |
| 6,125,395 | A | * | 9/2000 | Rosenberg et al. ......... 709/228 |

FOREIGN PATENT DOCUMENTS

| EP | 0 778 534 A1 | 6/1997 | ........... G06F/17/30 |
| EP | 0 810 534 A2 | 12/1997 | ........... G06F/17/30 |
| EP | 0 926 606 A2 | 6/1999 | ........... G06F/17/30 |
| GB | 2329 988 A | 4/1999 | ........... G06F/17/30 |

* cited by examiner

Primary Examiner—John Breene
Assistant Examiner—Debbie Le
(74) Attorney, Agent, or Firm—Darby & Darby

(57) ABSTRACT

A method of operating a computer system (1) having a display (6) and being connected to the WWW (4). A Web page is downloaded into a buffer memory (8) of the computer system (1) from the WWW (4), the page being an HTML file. Keywords are identified in the downloaded page and the HTML file held in the buffer memory (8) is then modified on-the-fly to introduce links to a database searching application, each link corresponding to an identified keyword. The downloaded Web page is displayed on the computer system display (6), with the introduced links appearing as user selectable items. By selecting a link, the searching application is launched and previously downloaded Web pages which contain the associated keyword are identified.

15 Claims, 2 Drawing Sheets

TeamWARE Mail 5

For Business Critical Messaging

TeamWARE Mail 5 is a ready-to-run e-mail service combining the ease-of-use and global reach of Internet SMTP/ MIME e-mail, access to LDAP/X.500 based directories, with the security, reliability, and maintainability of an Intranet messaging system. TeamWARE Mail 5 offers X.400 connectivity to reach those important business partners who prefer X.400-based mail. The Connector for Fax enables sending faxes in the same easy way as sending e-mail. Mobile users can utilize the Connector for SMS to receive notifications through GSM network.

TeamWARE Mail 5 is modular and scaleable, which allows you to add functionality when you need it, and secures the growth path for your messaging system.
TeamWARE Mail's key features are:

TeamWARE Mail 5 Server:

- Advanced Internet Mail (SMTP/MIME), X.400(88) Mail and Connectors for Fax and SMS • Message and attachment compression, mailbox and message size control.
- Windows-based user and system administration, On-line backup for 7 x 24 operations, Incremental backup support
- Customisable Organization and Personal Directories, transparent LDAP search and directory synchronization
- Support for IMAP4 and POP3 client protocols TeamWARE Mail 5 Client:

- Rich Text Format (RTF) mail editor, Reminders, Server-based notifications
- Searchable, hierarchical mail folders
- Mailbox permissions, private folders
- Desktop integration through Simple MAPI
- Agents for executing previously defined tasks on behalf of user

Figure 2

ELECTRONIC FILE RETRIEVAL METHOD AND SYSTEM

FIELD OF THE INVENTION

The present invention relates to an electronic file retrieval method and system and more particularly to a method and system which allows a computer system user to retrieve previously processed files which are relevant to a file which is currently being considered by the user.

BACKGROUND OF THE INVENTION

Given the recent dramatic increases in the computer memory available to users of Personal Computers (PCs), users now have the possibility to create massive personal document archives. Added to this is the possibility of retrieving documents over the World Wide Web (WWW) which provides an almost unlimited source of information. Whilst these developments greatly increase the knowledge available to a PC user, it is not often easy for the user to locate information which is relevant to a current task.

Sophisticated search engines have been developed to enable WWW users to "surf" the WWW. These engines, for example AltaVista™, generally operate by exhaustively extracting words from Web pages published on the WWW. Links to these pages are then added to a database alongside the corresponding word entries. Search algorithms have also been developed for searching documents stored, for example, on the hard disc drive of a PC. Again these tend to conduct an exhaustive search of the stored documents for a user defined keyword.

SUMMARY OF THE PRESENT INVENTION

It is an object of the present invention to provide a method and system which is able to identify electronic documents or files which are relevant to another electronic document downloaded from a data network, and to incorporate direct or indirect links to those relevant documents or files into the downloaded document.

According to a first aspect of the present invention there is provided a method of operating a computer system, the computer system being connected to a data network and comprising a display and a database storing a set of documents and/or document identifiers, the method comprising:

downloading an electronic document into the computer system over the data network, the document being in the form of computer readable code;
 identifying keywords in the downloaded document;
 modifying said computer readable code to introduce thereinto hyper-links to enable a user to link to documents stored or identified in said database and containing at least one of said keywords; and
 displaying the downloaded document on the computer system display, where the introduced hyper-links appear as user selectable items.

Preferably, said step of identifying keywords comprises defining a global keyword list on the basis of the stored and/or identified documents and the downloaded document, and identifying those of the global keywords present in the downloaded document. More preferably, the global keyword list is defined by analysing word occurrence rate distribution over the documents.

Preferably, the said step of modifying the computer readable code comprises creating a hyper-link for each identified keyword. More preferably, the method comprises the further steps of:

activating one of said introduced hyper-links;
 determining which of the stored and/or identified documents contain the associated keyword;
 determining a similarity/dissimilarity coefficient for each of these documents; and
 displaying a list of these documents together with the similarity/dissimilarity coefficient.

The displayed list preferably includes hyper-links to the listed documents.

Preferably, hyper-links are displayed by highlighting, e.g. using a colour change, underlining, or italicizing, the keywords identified in the downloaded document. Links may also be displayed as specific characters, e.g. ".", "!", "?".

Preferably, said computer readable code is Hyper Text Markup Language (HTML), in which case said steps of downloading and displaying may be performed by a Web browser.

Preferably, the data network over which the electronic document is downloaded is the World Wide Web. The step of displaying the downloaded document (with added links) may involve interpreting the document with an Internet Browser.

The identifier may be a document title, a computer drive path, or Universal Resource Locator (URL) to an Web page, or a combination of these. The documents used to construct the database may include Web pages, word processed documents, and electronic mail items.

According to a second aspect of the present invention there is provided a programmed computer system comprising;

communication means coupled to a data network for downloading an electronic document over the data network, the document being in the form of a computer readable code;
 an electronic database storing a set of documents and/or document identifiers;
 first processing means arranged in use to identify keywords in said downloaded document;
 second processing means arranged in use to modify said computer readable code to introduce thereinto hyper-links to enable a user to link to documents stored or identified in said database and containing at least one of said keywords; and
 a display and display driver means arranged in use to display the downloaded document on the computer system display in a form where the introduced hyper-links appear as user selectable items.

In certain embodiments of the above second aspect of the present invention, the computer system is provided by a suitably programmed computer, where the communication means is a data modem of the computer, and the first and second processing means comprises a microprocessor or a digital signal processor.

In other embodiments of the invention the system comprises a personal computer connected to a local area network, which is coupled to the WWW via a router. Said database and said first and second processing means may be provided in said personal computer or in a second computer also connected to the local area network and accessible by other personal computers. Alternatively, the database and first and second processing means may be replicated in the personal computer and in one or more other computers of the local area network, to provide a hierarchy of "knowledge" servers.

According to a third aspect of the present invention there is provided a computer memory encoded with executable instructions representing a computer program for causing a computer system connected to a data network to:

construct an electronic database storing a set of documents and/or document identifiers;

download an electronic document into the computer system over the data network, the document being in the form of a computer readable code;

identify keywords in said document;

modify said computer readable code to introduce thereinto hyper-links to enable a user to link to documents stored or identified in said database and containing at least one of said keywords; and display the downloaded document on the computer system display, where the introduced hyper-links appear as user selectable items.

BRIEF DESCRIPTION OF THE DRAWINGS

For a better understanding of the present invention and in order to show how the same may be carried into effect reference will now be made, by way of example, to the accompanying drawings, in which:

FIG. 2 shows a displayed Web page with hyper-links added on-the-fly.

DETAILED DESCRIPTION OF CERTAIN EMBODIMENTS

Figure 1:
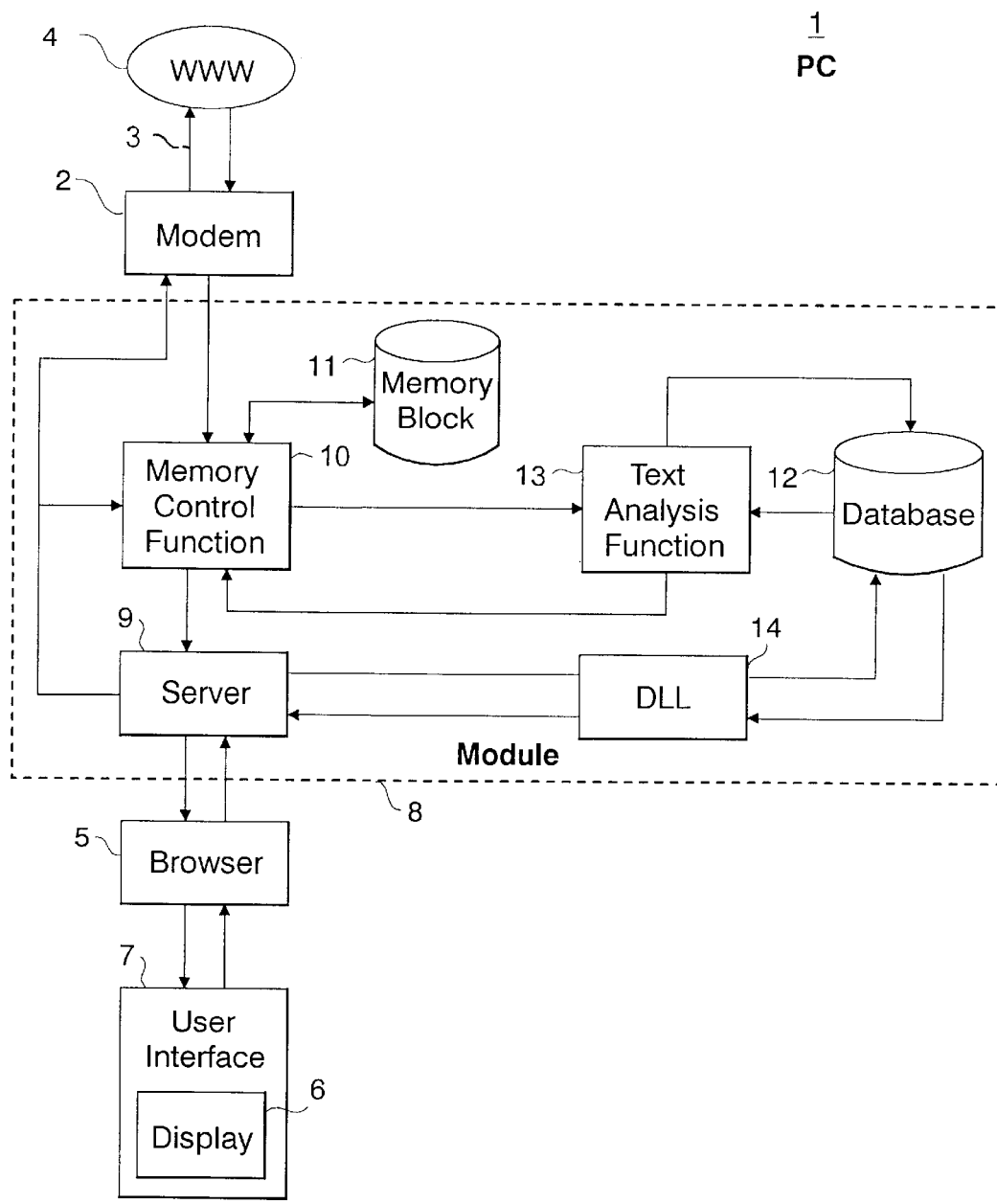
FIG. 1 shows schematically a computer connected to the WWW and arranged to construct and make use of a knowledge database.

With reference to FIG. 1, a personal computer (PC) 1 is shown functionally and is indicated generally by the reference numeral 1. The PC 1 has a modem 2 which enables the PC 1 to be connected to a telephone line 3 and via the telephone line to the WWW 4. It will be understood that this connection may additionally involve an Internet Service Provider (ISP) although this is not shown in the Figure. It will also be appreciated that the PC 1 may alternatively be connected to the WWW 4 via a local area network (LAN) having its own Network Access Server (NAS).

Using a computer program stored in a memory of the PC 1 and executed by a central processing unit, the PC 1 is provided with an Internet browser 5. This may be a conventional browser such as Microsoft Internet Explorer™ or Netscape Navigator™, but in any case is capable of requesting and retrieving a Web page from the WWW 4 via the modem 2 using http or another suitable Internet protocol and a Universal Resource Locator (URL) or similar identifier (e.g. Universal Resource Name) identifying the page.

As is already well known, the WWW makes use of a special programming language or code known as Hyper Text Mark-up Language (HTML) to encode Web pages, and the Internet browser 5 is capable of interpreting this code and causing a received page to be displayed on a display 6 of a user interface 7 of the PC 1. Using HTML, so called "hyper-links" may be incorporated into a Web page. Hyper-links are elements of a Web page, e.g. legends, word, pictures etc., which the user may select using a computer mouse. Selecting a hyper-link normally causes the browser 5 to download a further Web page from the WWW 4, which page is identified in the originally received HTML by a URL associated with that particular hyper-link.

FIG. 1 illustrates an additional software/hardware module 8 which is functionally placed between the Web browser 5 and the modem 2. The module may be implemented by suitably programming the cPu of the PC 1 or using a DSP or the like. The module 8 comprises a server 9 which communicates with the Web browser using TCP/IP. In the event that a user requests the downloading of a Web page from the WWW 4 by entering a URL, this request is relayed by the server 9 (acting as a proxy server) to the WWW. In relaying the request, the proxy server 9 also passes the URL to a memory control function 10 which stores the URL in an associated memory block 11.

When the requested Web page is returned from the WWW 4, the page is intercepted by the module 8 (on the basis of the stored URL) and is temporarily stored in the memory block 11 by the memory control function 10. Before forwarding the page to the Internet browser 5 for display, the page is modified in the memory block 11 as will be described below. Firstly however, it is necessary to explain the structure and function of a keyword database which is stored in a memory block identified by reference numeral 12 in FIG. 1.

The database 12 contains a "word" table which lists in a first column every word stem which appears in at least one previously analyzed document (in this example previously downloaded Web pages). For example, the words "produce", "produced", "produces", "producing", etc are represented in the table by a single stem "produc" (a suitable "stemming" algorithm is described in "Development of a Stemming Algorithm", Julie Beth Lovins, Mechanical Translation and Computational Linguistics, 11, 22–31, 1968). For each word (stem), the number of documents in which there are 0 occurrences of the word is entered in column 2, the number of documents in which there is 1 occurrence of the word is entered in column 3, etc. This is illustrated by Table 1 below from which it can be seen that word #3 occurs 0 times in 45 documents, 1 time in 1 document, etc.

Using the information contained in the above table, it is possible to determine which of the words listed are likely to be keywords. This process is described in two articles titled "A Probabilistic Approach to Automatic Keyword Indexing", Part I, Journal of the American Society for Information Science, July–August 1975, pp 197–206; Part II, Journal of the American Society for Information Science, September–October 1975, pp 280–289. Briefly, the process involves determining, for each listed word, the Poisson distribution of the rate of occurrence and determining the error between the actual distribution and the Poisson distribution. A constant is then defined, and words for which the error is less than that constant are identified as keywords. Those listed words which are identified as being keywords are identified in an additional column of the above table by a keyword flag, set to 1 if the word is a keyword and 0 if it is not a keyword. These keywords are global in the sense that they are derived on the basis of all analyzed documents.

The database 12 contains a second table referred to as the "document" table. This table contains for each examined document the number of occurrences of each word together with the URL identifying the document. An example of such a table is shown below in Table 2 from which it can be seen that document 2 contains a single occurrence of word #1, 23 occurrences of word #2 etc.

It will be appreciated that when the system is first initiated, the word and document tables may be empty. These tables are then built-up as the system is used. It is of course also possible to pre-install tables based on the analysis of a number of representative documents.

Returning now to the downloaded Web page temporarily stored in the memory block 11, it will be appreciated that this page is typically in HTML format and is likely to contain several portions of text. This text is extracted by a text analysis function 13, and the word table stored in the database 12 is updated on the basis of the extracted text. The document table is similarly updated. On the basis of the updated word table, the keyword list is refined (and the keyword flags set accordingly).

The text analysis function 13 then scans the text contained in the downloaded Web page to identify keywords present therein. When a keyword is identified, the function 13 modifies the HTML code held in the buffer "on-the-fly", to introduce an associated hyper-link (the function of which is explained below). The following HTML listing shows a downloaded Web page which contains the keywords "TeamWARE"™,"Internet", "desktop", and "agents", and in which added hyper-links are shown underlined (this page did not contain any original hyper-links).

<HTML>
<HEAD>
<TITLE>TeamWARE Mail 5</TITLE>
</HEAD>
<BODY bgcolor="ffffff" TEXT="#000000" link= "#ff0000" vlink="#990000" alink="#ff000">
<blockquote>
<H1><A HREF="http://niemi terho/page-62/word-29329/default" TARGET="top"STYLE="color: green">TeamWARE</A>Mail 5</H1>
<H2>For Business Critical Messaging</h2>
<P>&nbsp;</p>
<h3><A HREF="http://niemi terho/page-62/word-29329/default" TARGET="top" STYLE="color: green">TeamWARE</A>Mail 5 is a ready-to-run</h3>
<B>e-mail service combining the ease-of-use and global reach of <A HREF="http://niemi terho/page-62/word-34488/default" TARGET="top" STYLE="color: green">Internet</A>SMTP/MIME e-mail, access to LDAP/X.500
based directories, with the security, reliability, and maintainability of an Intranet messaging system. <A HREF= "http://niemi terho/page-62/word-29329/default"
TARGET="top" STYLE="color: green">TeamWARE</A>Mail 5 offers X.400 connectivity to reach those important business partners who prefer X.400-based mail. The Connector for Fax enables sending faxes in the same easy way as sending e-mail. Mobile users can utilize the Connector for SMS to receive notifications through GSM network.</B>
<p>
<B><A HREF="http://niemi terho/page-62/word-29329/default" TARGET="top"
STYLE="color: green">TeamWARE</A>Mail 5 is modular and scaleable, which allows you to add functionality when you need it, and secures the growth path for your messaging system. <A HREF="http://niemi terho/page-62/ word-29329/default" TARGET="top" STYLE=-"color: green">TeamWARE</A>Mail's key features are:</B><p>
<A HREF="http://niemi terho/page-62/word-29329/default" TARGET="top" STYLE="color: green">TeamWARE</A>Mail 5 Server:
<UL>
<LI>Advanced <A HREF="http://niemi terho/page-62/word-34488/default" TARGET="top"
STYLE="color: green">Internet</A>Mail (SMTP/MIME), X.400(88) Mail and Connectors for Fax and SMS
<LI>Message and attachment compression, mailbox and message size control
<LI>Windows-based user and system administration, On-line backup for 7×24 operations, Incremental backup support
<LI>Customisable Organization and Personal Directories, transparent LDAP search and directory synchronization
<LI>Support for IMAP4 and POP3 client protocols
</UL>
<h3><A HREF="http://niemi terho/page-62/word-29329/default" TARGET="top" STYLE="color: green">TeamWARE</A>Mail 5 Client:</h3>
<UL>
<LI>Rich Text Format (RTF) mail editor, Reminders, Server-based notifications
<LI>Searchable, hierarchical mail folders
<LI>Mailbox permissions, private folders <LI><A HREF="http://niemi terho/page-62/word-34490/default" TARGET="top" STYLE="color: green">Desktop</A>integration through Simple MAPI
<LI><A HREF="http://niemi terho/page-62/word-523/default" TARGET="top" STYLE="color: green">Agents</A>for executing previously defined tasks on behalf of users
</UL>
</BODY>
</HTML>

After modification of the HTML code on-the-fly, the Web page is returned from the memory block 11 to the Web browser 5 via the memory control function 10 and the server 9. FIG. 2 shows the Web page corresponding to the above code as displayed by the Web browser 5. The added hyper-links are shown underlined, although it will be appreciated (from the above code) that when displayed in colour these will appear green.

Assume now that the user wishes to locate documents which are related to the downloaded page, and in particular are related by way of the keyword "Internet". By clicking on one of the "Internet" hyper-links added to the Web page, the user causes the Web browser 5 to request from the server 9 (acting as Web server) the contents of the URL "http://niemi_terho/page-62/word-29329/default". The "default" identifier contained in this URL causes the Web server 9 to launch an application 14 termed a Dynamic Linkable Library (DLL) which links the Web server 9 to the database 12.

The URL word identifier, in this case "word-29329", identifies to the database 12 the keyword "Internet" in the word table, whilst the page identifier, "page-62", identifies the source document, i.e. the downloaded Web page, in the document table. The database 12 first of all identifies all of the documents identified therein which contain the keyword "Internet". A dissimilarity coefficient is then calculated for each of the identified documents, relative to the source document, as follows.

Consider that eight documents (1 to 8) containing the keyword "Internet" are identified, and that each of these contains one or more of the complete set of listed keywords (I to P, where I represents the keyword "Internet"). If "Ref" is the downloaded document (i.e. page-62), then this information can be represented graphically as illustrated in Table 3 below.

The dissimilarity coefficient for an identified document is calculated as follows:

$$\frac{|X \Delta Y|}{|X|+|Y|}$$

where X is the set of keywords contained in document Ref, Y is the set of keywords contained in the identified document in question, and $X \Delta Y=(X \cup Y)-(X \cap Y)$. So, for example, in the case of document 1, the numerator in the above equation equals 3 (i.e. 6 shared keywords minus 3 not shared keywords) whilst the denominator equals 9, giving a dissimilarity coefficient of 0.333 or 33.3%.

The DLL 14 returns from the database 12, to the Web server 9 and the Web browser 5, the URLs of the identified pages together with the respective dissimilarity coefficients. These are displayed to the user as a list of hyper-links. Assuming that the user selects one such hyper-link, the Web browser 5 causes the selected Web page to be downloaded over the WWW 4 and displayed on the display 6.

In order to prevent common words, such as "the", "and", from being identified as keywords, a STOP list may be defined which contains words which cannot be included in the word table. However, in order to provide for increased flexibility, it is preferred to include in the word table a keyword "lifetime" value which represents a number of days.

If the lifetime is negative, a word cannot become a keyword until the lifetime value reaches 0. So, for example, the lifetime of the word "and" may be set to –1000,000 days so that effectively it can never become a keyword. For a word such as "computer", which tends to be somewhat more distinctive, the lifetime may be set to –30 days. It can be expected that after a period of 30 days, the system will have been "educated" sufficiently to determine whether or not the term "computer" is indeed a relevant keyword.

On the other hand, the lifetime may be positive so that a user may force a word onto the keyword list for some fixed period of time. For example, if a user is currently interested in topics related to the Internet, then the lifetime of the word "Internet" could be defined as +30 days. Thus, "Internet" would be retained as a keyword for 30 days, after which its retention depends upon the keyword determination process described above.

The process described above may be easily modified to enable a user to identify Web pages which are associated to a downloaded Web page by something other than conventional keywords. For example, association may be carried out on the basis of names, dates, or tasks, or on the basis of some combination of these.

The process may also be extended to provide a hierarchy of "knowledge servers" forming a chain between the WWW 4 and the end user interface 7, each such server being provided with a module 8. Servers higher up in the chain will tend to serve a number of different PCs 1. For example, there may be provided a corporate knowledge server and a group knowledge server between the end user PC 1 and the WWW, in which case the corporate server collects keywords from Web pages downloaded to all users in the company, whilst the group server collects keywords from pages downloaded to only the members of a particular group.

It is also possible to extend the process to incorporate into the database details of non-Web page electronic files. For example, keywords could be identified in word processor generated files or in electronic mail received or sent by the PC 1. The location (i.e. drive paths) of these files could then be stored as the file links in the database 10. In the case of electronic mail, the function of the Web browser 5 may be replaced by an e-mail "client" such as Microsoft Outlook Express™. Typically the client then connects via the module 8 to a mail server.

The person of skill in the art will appreciate that modifications may be made to the above described embodiments without departing from the scope of the present invention. In particular, in computing the dissimilarity coefficient between a downloaded document and a previously archived document, account may be taken of the number of occurrences of a keyword in the documents. For example, Table 3 may be modified to replace the "√" signs with the number of occurrences of a given keyword in a given document. The equation described above for calculating the dissimilarity coefficient is replaced by a new equation in which the numerator is the sum of the absolute difference for each keyword, whilst the numerator is the total number of keywords in the two compared documents.

Considering for example Table 3, assume that the keywords I, J, K, and L appear 2, 3, 1, and 4 times respectively in document 1, whilst the keywords I, J, L, M, and O appear 1, 3, 2, 4, and 2 times respectively in document Ref. The numerator of the dissimilarity coefficient is given by:

$$|2-1|+|3-3|+|1-0|+|4-2|+|0-4|+|0-2|=10$$

whilst the denominator is given by:

$$(2+3+1+4)+(1+3+2+4+2)=22$$

so that the dissimilarity coefficient is 45.5%.

The calculation of the dissimilarity coefficient may be further modified to take into account document length. For example, the number of occurrences of a keyword in a document may be normalised by a normalising factor equal to the length of standard document divided by the length of the document in question.

TABLE 1

| | Number of occurrences/document | | | | | | |
| --- | --- | --- | --- | --- | --- | --- | --- |
| Word | 0 | 1 | 2 | 3 | 4 | 5 | etc | keyword flag |
| #1 | 8 | 1 | 15 | 21 | 1 | 7 | — | 0 or 1 |
| #2 | 6 | 45 | 23 | 6 | 26 | 17 | — | 0 or 1 |
| #3 | 45 | 1 | 34 | 10 | 18 | 12 | — | 0 or 1 |
| #4 | 23 | 4 | 56 | 34 | 29 | 28 | — | 0 or 1 |
| etc | — | — | — | — | — | — | — | 0 or 1 |

TABLE 2

| Document | Word #1 | Word #2 | Word #3 | etc | URL |
| --- | --- | --- | --- | --- | --- |
| 1 | 0 | 0 | 3 | — | www. etc |
| 2 | 1 | 23 | 5 | — | www. etc |
| 3 | 0 | 12 | 5 | — | www. etc |
| etc | — | — | — | — | www. etc |

TABLE 3

| | I | J | K | L | M | N | O | P |
| --- | --- | --- | --- | --- | --- | --- | --- | --- |
| 1 | ✓ | ✓ | ✓ | ✓ | | | | |
| 2 | ✓ | ✓ | ✓ | | | | | |
| 3 | ✓ | | | ✓ | | | | |
| 4 | ✓ | | ✓ | ✓ | | | ✓ | |

TABLE 3-continued

| | I | J | K | L | M | N | O | P |
|---|---|---|---|---|---|---|---|---|
| 5 | ✓ | | | | ✓ | ✓ | ✓ | |
| 6 | ✓ | | | | ✓ | ✓ | ✓ | |
| 7 | ✓ | | | | ✓ | ✓ | | ✓ |
| 8 | ✓ | | | | ✓ | ✓ | | ✓ |
| Ref | ✓ | ✓ | | ✓ | ✓ | | ✓ | |

What is claimed is:

1. A method of operating a computer system, the computer system being connected to a data network and comprising a display and a database storing a set of documents and/or document identifiers, the method comprising:
   downloading an electronic document into the computer system over the data network, the document being in the form of computer readable code;
   identifying keywords in the downloaded document;
   modifying said computer readable code to introduce thereinto hyper-links to enable a user to link to documents stored or identified in said database and containing at least one of said keywords; and
   displaying the downloaded document on the computer system display, where the introduced hyper-links appear as user selectable items.

2. A method according to claim 1, wherein said step of identifying keywords comprises defining a global keyword list on the basis of the stored and/or identified documents and the downloaded document, and identifying those of the global keywords present in the downloaded document.

3. A method according to claim 2, wherein the global keyword list is defined by analysing word occurrence rate distribution over the documents.

4. A method according to claim 1, wherein said step of modifying the computer readable code comprises creating a hyper-link for each identified keyword.

5. A method according to claim 4, wherein the method comprises the further steps of:
   activating one of said introduced hyper-links;
   determining which of the stored and/or identified documents contain the associated keyword;
   determining a similarity/dissimilarity co efficient for each of these documents; and
   displaying a list of these documents together with the similarity/dissimilarity coefficient.

6. A method according to claim 5 and comprising displaying said list as a set of hyper-links to the listed documents.

7. A method according to claim 1, wherein said computer readable code is Hyper Text Markup Language (HTML), and said steps of downloading and displaying are performed by a Web browser.

8. A method according to claim 1, wherein the data network over which the electronic document is downloaded is the World wide Web.

9. A method according to claim 1, wherein the document identifiers are a document title, a computer drive path, or Universal Resource Locator (URL) to an Web page, or a combination of these.

10. A programmed computer system comprising;
    communication means (5,2) coupled to a data network (4) for downloading an electronic document over the data network (4), the document being in the form of a computer readable code;
    an electronic database (12) storing a set of documents and/or document identifiers;
    first processing means (12,13) arranged in use to identify keywords in said downloaded document;
    second processing means (13) arranged in use to modify said computer readable code to introduce thereinto hyper-links to enable a user to link to documents stored or identified in said database (12) and containing at least one of said keywords; and
    a display (6) and display driver means (5,7) arranged in use to display the downloaded document on the computer system display in a form where the introduced hyper-links appear as user selectable items.

11. A system according to claim 10, wherein the computer system is provided by a suitably programmed computer (1), where the communication means (2,5) comprises a data modem of the computer (1), and the first and second processing means (12,13) comprise a microprocessor or a digital signal processor.

12. A computer memory encoded with executable instructions representing a computer program for causing a computer system connected to a data network to execute steps comprising:
    constructing an electronic database storing a set of at least one of documents and document identifiers;
    downloading an electronic document into the computer system over the data network, the document being in the form of a computer readable code;
    identifying keywords in said document;
    modifying said computer readable code to introduce thereinto hyper-links to enable a user to link to documents stored or identified in said database and containing at least one of said keywords; and
    displaying the downloaded document on the computer system display, where the introduced hyper-links appear as user selectable items.

13. A method of operating a computer system, the computer system being connected to a data network and comprising a display and a database storing at least one of a set of documents and document identifiers, the method comprising:
    downloading an electronic document into the computer system over the data network, the document being in the form of computer readable code;
    identifying keywords in the downloaded document;
    modifying said computer readable code to introduce thereinto hyper-links to enable a user to link to documents stored or identified in said database and containing at least one of said keywords; and
    displaying the downloaded document on the computer system display, where the introduced hyper-links appear as user selectable items, wherein said step of identifying keywords comprises defining a global keyword list on the basis of at least one of the stored and identified documents, and the downloaded document, and identifying those of the global keywords present in the downloaded document.

14. A programmed computer system comprising:
    communication means coupled to a data network for downloading an electronic document over the data network, the document being in the form of computer readable code;
    an electronic database in which at least one of a set of documents and document identifiers are stored;
    first processing means arranged to identify keywords in said downloaded document;
    second processing means arranged to modify said computer readable code to introduce thereinto hyper-links to enable a user to link to documents stored or identified in said database and containing at least one of said keywords; and a display arranged to display the downloaded document in a form where the introduced hyper-links appear as user selectable items, wherein said second processing means is arranged to identify keywords by defining a global keyword list on the basis of at least one of the stored and identified documents and the downloaded document, and to identify those of the global keywords present in the downloaded document.

15. A computer memory encoded with executable instructions representing a computer program for causing a computer system connected to a data network to execute steps comprising:

constructing an electronic database storing a set of at least one of documents and document identifiers;

downloading an electronic document into the computer system over the data network, the document being in the form of a computer readable code;

identifying keywords in said document by defining a global keyword list on the basis of at least one of the stored and identified documents and the downloaded document, and identifying those of the global keywords present in the downloaded document;

modifying said computer readable code to introduce thereinto hyper-links to enable a user to link to documents stored or identified in said database and containing at least one of said keywords; and displaying the downloaded document on the computer system display, where the introduced hyper-links appear as user selectable items.

* * * * *